United States Patent [19]
Passeri

[11] 3,872,724
[45] Mar. 25, 1975

[54] GAS METERS
[75] Inventor: Jorge Passeri, Buenos Aires, Argentina
[73] Assignee: Galileo Argentina, Comercial, Industrial Y Financiera, Sociedad Anonima, Buenos Aires, Argentina
[22] Filed: Dec. 20, 1972
[21] Appl. No.: 317,086

[30] Foreign Application Priority Data
Dec. 21, 1971  Argentina ............................ 239724

[52] U.S. Cl. ................................................ 73/267
[51] Int. Cl. ............................................. G01f 3/20
[58] Field of Search ...................... 73/265, 266, 267

[56] References Cited
UNITED STATES PATENTS
| | | | |
|---|---|---|---|
| 637,424 | 11/1899 | Seymour | 73/265 |
| 686,773 | 11/1901 | Seymour | 73/265 |
| 1,090,507 | 3/1914 | Thornton et al. | 73/266 |
| 3,161,049 | 12/1964 | St. Clair et al. | 73/267 |
| 3,369,398 | 2/1968 | Porter et al. | 73/266 X |

*Primary Examiner*—Richard C. Queisser
*Assistant Examiner*—John P. Beauchamp
*Attorney, Agent, or Firm*—Cushman, Darby & Cushman

[57] ABSTRACT

A diaphragm-type dry gas meter with a pair of measuring chambers on each side of a central partition, each chamber being divided into adjacent subchambers by a diaphragm, a rotatable valve for controlling the flow of gas into and out of said subchambers, said valve being rotated by movement of said diaphragms, which movement is also transmitted to flag means for indicating the quantity of gas flowing through the meter.

2 Claims, 4 Drawing Figures

PATENTED MAR 25 1975
3,872,724
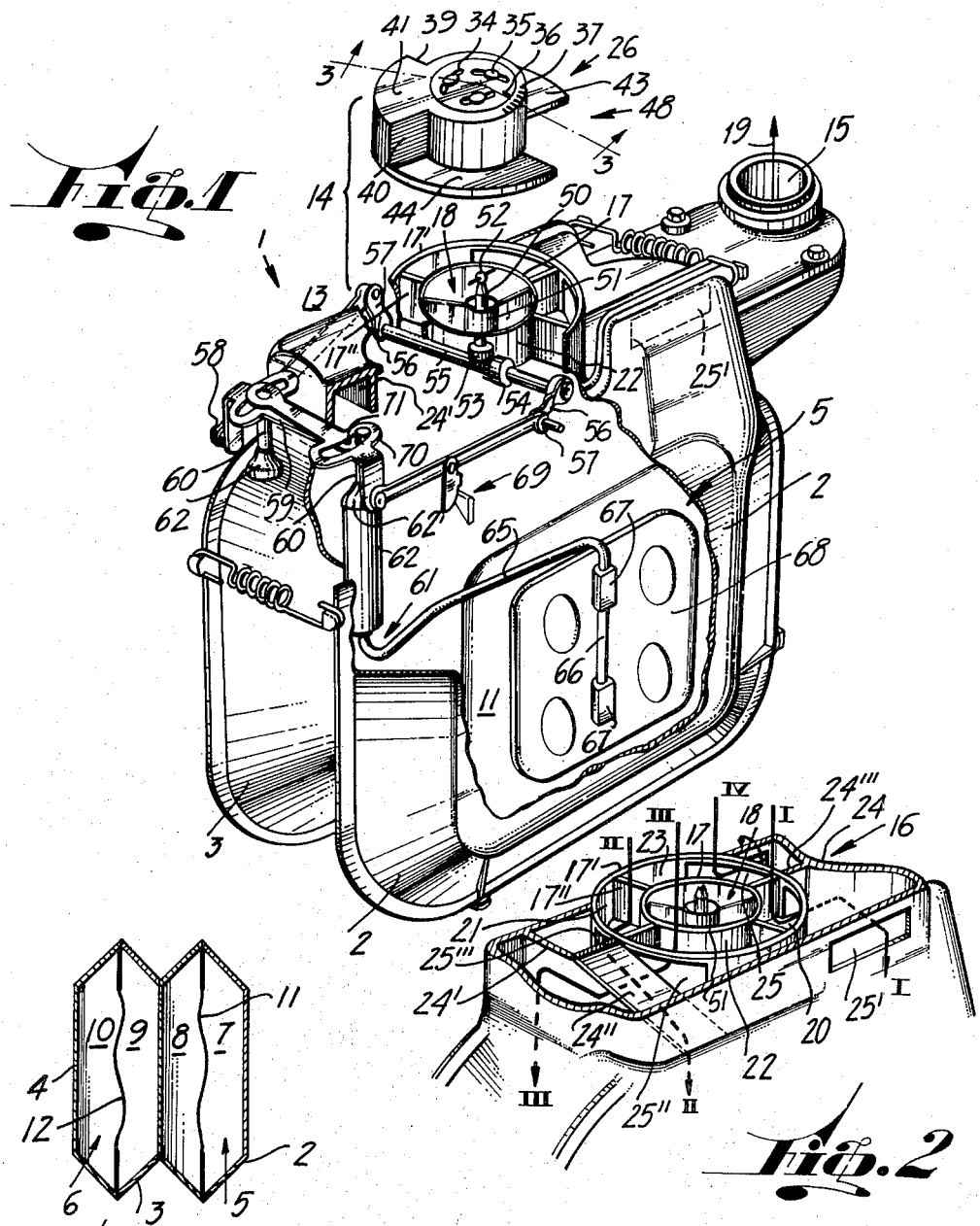
Fig. 1
Fig. 2
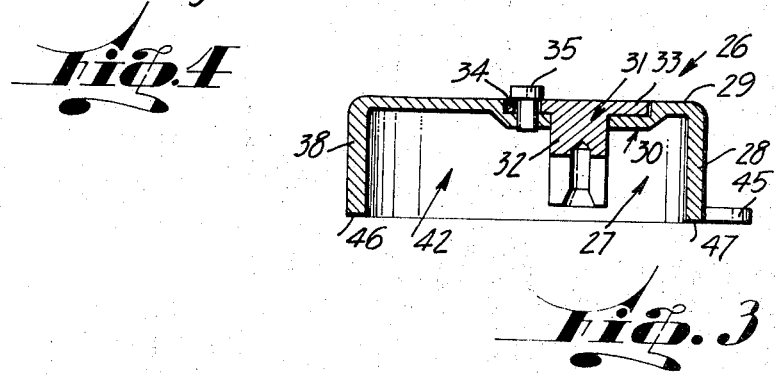
Fig. 4
Fig. 3

3,872,724

GAS METERS

FIELD OF THE INVENTION

The present invention relates to gas meters and more particularly to diaphragm-type dry gas meters incorporating a rotatable distributor valve.

BACKGROUND OF THE INVENTION

Diaphragm-type dry gas meters are well known in the art such as can be seen in U.S. Pat. No. 3,589,189, granted on June 29, 1971; U.S. Pat. No. 3,415,121, granted on Dec. 10, 1968; U.S. Pat. No. 2,818,046, granted on Dec. 31, 1957. However, some known diaphragm-type dry gas meters incorporate a pair of slide valves for opening and closing the chambers of the meter and which are driven by the diaphragms which generally divide the two measuring chambers of the meter into four subchambers, whereby the gas ingress and egress from such chambers is controlled by the slide valves. The diaphragms also drive a counter or flag unit showing the volume of gas passing through the meter.

However, it has been found that this known type of meter incorporating slide valves is not reliable for prolonged periods of use because of wear at the various connecting points of the links connecting the diaphragms to the valves. This wear causes the valves to become dephased thereby affecting the correct measurement of the volume of gas flowing through the meter.

In addition to this drawback it has also been found that it is each day becoming increasingly important to reduce the manufacturing cost of articles which are not directly purchased by a user, but are lent (as happens with gas meters, in some countries) by a company offering a service (such as a gas supply company). This reduction in cost, if multiplied by the amount of articles (gas meters) in use represents a very substantial saving in the overhead expenses of the company providing the service. An even further saving is obtained by reducing repair work on the articles whereby it is also important to provide a gas meter incorporating less mechanical parts, and which in addition is of simple and rugged construction.

An even further drawback of diaphragm gas meters incorporating slide valves is their size. As technology advances everyone expects to be provided with a better service, at a lower cost and if such service is rendered by a device incorporated in a home or office, it is additionally expected that the device be as small as possible so as to occupy only the space indispensable for its operation. This space requirement is even more important in large buildings where ten or fifty or fivehundred meters have to be positioned side by side to thereby facilitate their reading by an authorized officer of the gas supply company. It will be easy to see what an enormous saving of space can be obtained even by a reduction of 20 percent in the size of the meter.

A further drawback of known gas meters incorporating reciprocating slide valves is the considerable mechanical resistance the slide valves offer particularly at each end of their displacement when their direction of movement is reversed. The present invention overcomes this drawback by providing rotary unidirectional valve means.

An even further drawback of some known gas meters is that they do not incorporate simple means for dephasing the movement of the slide valves with respect to their respective drive means.

The aim of the present invention is to overcome all the drawbacks pointed out above and provide an improved gas meter of simpler, cheaper, more reliable and more compact construction.

In this respect, the gas meter of the present invention incorporates a simple valve member, in place of two slide valves as is required by known meters whereby the more uniform distribution of gas from the inlet to the chambers and from the chambers to the outlet is achieved by elimination of any dephasing between two valve members; in addition, the provision of a rotaty valve makes it possible for the gas conduits to be of larger cross section thereby reducing pressure drops in the gas line.

SUMMARY OF THE INVENTION

In accordance with the present invention there is provided a gas meter comprising a gas-tight casing; a gas inlet and a gas outlet for said casing; diaphragm means movably mounted in said casing and defining two measuring chambers; rotary valve means for communicating said inlet with one of said chambers and simultaneously communicating the other of said chambers with said outlet, and connecting means for receiving linear movement from said diaphragm, converting this linear movement into rotary movement and applying this rotary movement to said valve means. Preferably four measuring chambers are provided, grouped in twos, and each two being hermetically separated by the diaphragm means. in this case the rotary valve means controls the flow of gas into and out of the subchambers.

BRIEF DESCRIPTION OF THE DRAWINGS

FIG. 1 is a front schematic perspective exploded view, partially cut away, of a diaphragm-type dry gas meter, excluding its outer casing, and incorporating the features of the present invention.

FIG. 2 is a schematic perspective view of the upper portion (partially cut away) of the part of the gas meter shown in FIG. 1.

FIG. 3 is a cross sectional view taken along axis 3—3 of FIG. 1 of the rotary gas distributing member.

FIG. 4 is a schematic vertical cross sectional view showing the measuring chambers and diaphragms of a conventional gas meter.

DESCRIPTION OF THE PREFERRED EMBODIMENT

Dry gas meters of the type to which the present invention relates comprise an outer gas tight housing member (not shown) provided with means for coupling the meter to a gas supply source and to a gas consumption network or device. Within this housing there is mounted a gas tight casing 1 having walls 2, 3 and 4 (only those indicated by reference numbers 2 and 3 are visible in FIG. 1) which define two measuring chambers 5, 6. Each measuring chamber is hermetically divided into two adjacent subchambers 7, 8, 9 and 10 by a diaphragm 11, 12 peripherically secured therein so that its central portion is movable in response to pressure differences between adjacent subchambers 7, 8 or 9, 10.

Between gas tight housing and casing 1 (surrounding casing 1) there is defined a gas distributing chamber 13 in direct communication with said means for coupling the meter to a gas supply source. Distributing chamber 13 becomes communicated successively with each subchamber 7, 8, 9 and 10 by valve means 14 to be described further on. These valve means 14 also serve to successively communicate subchambers 7, 8, 9 and 10 to an outlet 15 directly connectable to said means, on the housing not shown, for coupling the meter to a gas consumption network or device. The movement of the diaphragms is transmitted to flag or indicating means (not shown) mounted on said housing and which indicate the quantity of gas flowing from inlet to outlet.

So far the structure described is common to most dry, diaphragm-type gas meters which are well known to those skilled in the art, so that further details and particulars which are not directly related to the improvement in accordance with the present invention will not be further described.

As more clearly shown in FIG. 2 the novel gas meter incorporates, at the upper portion of casing 1 a stationary gas channelling structure 16 defining four individual gas paths represented by arrow I-II-III-IV (FIG. 2) each leading to a predetermined one of said subchambers. This gas channelling structure comprises a wall 17, defining a central duct 18 connected to gas outlet 15 as schematically represented by arrow 19 and walls 17', 17'' defining four surrounding ducts 20, 21, 22, 23. Each duct 20, 21, 22 and 23 is connected to one subchamber 7, 8, 9 and 10, thereby defining paths I-II-III-IV, by means of further walls 24, 24', 24'', 24'''and openings 25, 25', 25'', 25''' arranged as shown in FIG. 2.

The upper edges of walls 17, 17' and 17'' are substantially coplanar and smooth so as to define a good sealing contact with the equally smooth surfaces of a rotary gas distributing member 26.

The rotary gas distributing member 26 rests upon the open central part of stationary gas channelling structure 16 and is rotatable with respect thereto.

Gas distributing member 26 comprises a first hollow central portion 27 defined by a partially cylinder shaped wall 28 and a top walls 29. Top wall 29 has a recessed open portion 30 in which there is mounted a mushroom shaped connector 31 having a hub portion 32 open at its lower end and a skirt portion 33 in which there are defined three slots 34. Connector 31 is secured to gas distributing member 26 by means of three screws 35 extending through slots 34 and screwed into recessed portion 30. Skirt portion 33 has an index mark 36 defined thereon while top wall 29 contains indicia 37 whereby the relative position between connector 31 and gas distributing member 26 can be established. In this way it is possible to reduce the error percent for large volumes of gas in circulation.

Rotary gas distributing member 26 also comprises a peripheral wall 38 which together with axial walls 39 and 40 and radial wall 41 define a peripheral chamber 42 in communication with hollow portion 27.

Rotary gas distributing member 26 also comprises two projecting blocking portions 43 and 44 having flat underfaces 45 (only one is partially visible in FIG. 3). The bottom edges 46 and 47 of walls 28 and 38 as well as the underfaces 45 of blocking portions 43 and 44 are preferably coplanar and smooth so as to define, as stated above, a good sealing contact with the upper edges of walls 17, 17' and 17'' of gas channelling structure 16 when the rotary gas distributing member 26 is positioned upon gas channelling structure 16. Obviously the contact edges of gas channelling structure 16 and of rotary gas distributing member 26 can have any configuration so long as a hermetic contact is established therebetween.

Between blocking portions 43 and 44 there is a free portion 48.

Although it is preferable that walls 17'' be arranged at 90° intervals one with respect to another, other angular relationships can be provided as long as the angular scope of the four sectors of gas distributing member 26, that is to say, peripheral chamber 42, blocking portions 43, 44 and free portions 48, which is also 90° for each, is modified accordingly. For example, and in this respect, each chamber 7, 8, 9 and 10 could be communicated with two ducts in place of only one, in which case the sectors of gas distributing member 26 would be subdivided and angularly arranged accordingly, as will be obvious to an expert in this art.

The movement transmitting means mechanically connecting the diaphragms 11, 12 to the rotary gas distributing member 26 comprise a shaft 50 rotatably extending through a bushing 51 stationarily mounted within central duct 18. The upper end of shaft 50 has a connecting device 52 mounted thereon and adapted to fit into hub portion 32 and become mechanically coupled thereto. At this lower end, shaft 50 has a crown gear 53 mounted thereon and in meshing engagement with a complementary gear 54 mounted upon a horizontal shaft 55 which extends at both ends through casing 1. Each end of shaft 55 is secured to one end of a connecting link 56 which supports at its other end a pivot pin 57 for a connecting rod 58. The other end of connecting rod 58 is pivoted to one end of L shaped connecting lever 59 while its other end is rigidly secured to a first vertical portion 60 of a connecting rod 61. Connecting rod 61 extends into casing 1 through a bushing 62 provided with an elastic hood 62' serving to define a hermetic seal between casing 1 and portion 60 of connecting rod 61.

Connecting rod 61 also comprises a horizontal portion 65 followed by a vertical portion 66 pivotally secured by means of bushing members 67 to a reinforcing plate 68 riveted to diaphragm 11.

To facilitate this description, only the movement transmitting means on one side of the meter has been described. Obviously the mechanical connection between diaphragm 12 and the rearmost end of shaft 55 (as seen in Fig. 1) is substantially identical to the mechanical connection described. Insofar as possible the same reference numbers have been used, both for the foremost as well as the rearmost parts of the movement transmitting means so as to facilitate the interpretation of this description.

A preferred arrangement of the mechanical transmitting means just described, for converting the linear movement received from the diaphragms 11, 12 into unidirectional rotational movement and applying this rotary movement to the valve means 26, is shown in FIG. 1. Because of symmetry both "L" shaped connecting levers 59 are positioned one above the other and adjacent one end thereof they include an expanded portion 70 within which there is defined a slot 71 through which the vertical portion 60 of connecting rod 64 extends and which permits the angular movement of the "L" shaped connecting levers 59.

Pivot pin 57 projects beyond connecting rod 58 and normally has gear means mounted thereon for driving the counter mechanism which indicates the volume of gas flowing through the meter.

The movement transmitting means connecting the diaphragms to the rotatable gas distributing member 26 also comprise means 69 for avoiding the reverse movement of the arrangement, whereby it is assured that the indicating mechanism or flag means and which is driven by the diaphragms through pin 57 cannot be obstructed by reverse movement of the movement transmitting means.

In operation, and once the gas meter is connected to a gas supply source and to a consumer device or arrangement, chamber 13 (surrounding casing 1) will be filled with gas. This gas will also fill the subchamber 7, 8, 9 or 10 which is in open communication with chamber 13 through free portion 48 and one or two of the ducts 20, 21, 22 or 23 over which such free portion 48 extends at that time. Let us suppose for the sake of this description that the rotary gas distributing member 26 is in the following first fundamental position:

Free portion 48 extends over duct 20 while blocking portions 43, 44 extend over ducts 22 and 23, and peripheral chamber 42 extends over duct 21. In this way gas will enter into subchamber 7 through duct 20 (path I) urging diaphragm 11 to the left (see FIG. 4) and discharging the gas contained in subchamber 8 through duct 21, peripheral chamber 42, hollow central portion 27, central duct 18 and outlet 15 (path of arrow 19). Simultaneously ducts 22 and 23 (and therefore subchambers 9 and 10) will be blocked by blocking portions 43 and 44.

The movement of diaphragm 11 will be transmitted to gas distributing member 26 which will rotate towards a next fundamental position (rotated in 90° with respect to the position just described) obviously going through an infinity of intermediate positions in which the same effects as herein pointed out for the fundamental positions are achieved, in spite of any overlapping between the ducts and sectors of gas distributing member 26. In the next fundamental position gas will enter into subchamber 9 through duct 22 (path III) urging diaphragm 12 to the left (see FIG. 4) and discharging the gas contained in subchamber 10 through duct 23, peripheral chamber 42, hollow central portion 27, central duct 18 and outlet 15 (path of arrow 19). Simultaneously ducts 20 and 21 (and therefore subchambers 7 and 8) will be blocked by blocking portions 43 and 44.

Similarly in the next fundamental position of member 26 (also rotated in 90°) gas will enter into subchamber 8 through duct 21 (path II) urging diaphragm 11 to the right (see FIG. 4) and discharging the gas contained in subchamber 7 through duct 20, peripheral chamber 42, hollow central portion 27, central duct 18 and outlet 15 (path of arrow 19). Simultaneously ducts 22 and 23 (and therefore subchambers 9 and 10) will be blocked by blocking portions 43 and 44.

In the last fundamental position gas will enter into subchamber 10 through duct 23 (path IV) urging diaphragm 12 to the right (see FIG. 4) and discharging the gas contained in subchamber 9 through duct 22, peripheral chamber 42, hollow central portion 27, central duct 18 and outlet 15 (path of arrow 19). Simultaneously ducts 21, 22 (and therefore subchamber 7 and 8) will be blocked by blocking portions 43 and 44.

The intermediate positions, because of the order in which the ducts 20, 21, 22, 23 are connected to the subchambers 7, 8, 9, 10 afford the same results as the four fundamental positions described by way of example.

This order as well as the 90° relationship between connecting links 56 assures the absence of dead centre positions at which the meter could, if not thus arranged, become jammed.

In the case of a meter with only three subchambers, the structure is similar to that shown except that wall 3 would be done away with, and subchambers 8 and 9 would be in communication, with an aggregate volume double to that of chambers 7 or 10. Obviously gas channelling structure would be modified so as to incorporate three ducts and gas distributing member 26 would only comprise three sectors.

It will be ovious to those skilled in the art that it is possible to provide a number of modifications within the spirit of the present invention, as long as they fall within the scope of the appendant claims.

I claim:

1. In a gas meter comprising a gas-tight casing having two measuring chambers defined therein; a gas inlet and a gas outlet; two diaphragms, one diaphragm being movably mounted in each chamber to define four subchambers; rotary valve means for controlling the flow of gas into and out of said subchambers; means for receiving linear movement from said diaphragms, converting the linear movement into rotary movement and applying the rotary movement to said rotary valve means; and means for indicating the quantity of gas flowing from said inlet to said outlet in response to movement of said diaphragms, the improvement comprising means for varying the relative angular position between said rotary valve means and the means for applying rotary movement to said valve means, said means for varying the relative angular position are a connector member having a portion for receiving said means for applying rotary movement to said valve means, said connector member being angularly movable with respect to said rotary valve means and adapted to be secured thereto in a selected relative position.

2. In a gas meter comprising a gas-tight casing having two measuring chambers defined therein; a gas inlet and a gas outlet; two diaphragms, one diaphragm being movably mounted in each chamber to define four subchambers; rotary valve means for controlling the flow of gas into and out of said subchambers, means for receiving linear movement from said diphragms, converting the linear movement into rotary movement and applying the rotary movement to said rotary valve means; and means for indicating the quantity of gas flowing from said inlet to said outlet in response to movement of said diaphragms, the improvement comprising means for varying the relative angular position between said rotary valve means and the means for applying rotary movement to said valve means, said means for varying the relative angular position comprising a connector means disposed within a recessed open portion defined in said rotary valve means and adjustably secured thereto for relative limited rotation with respect thereto and comprising a hub portion extending through said recessed open portion and connected to said means for applying rotary movement to said valve means.

* * * * *